United States Patent [19]

Proell et al.

[11] Patent Number: 5,131,160
[45] Date of Patent: Jul. 21, 1992

[54] DEVICE FOR MEASURING WOODRUFF KEYWAYS AND METHOD OF USING

[75] Inventors: Heinz Proell, Brookfield; Dietrich Wienss, Pewaukee; John Fischer, Wauwatosa, all of Wis.

[73] Assignee: Dreier Corporation, Brookfield, Wis.

[21] Appl. No.: 740,897

[22] Filed: Aug. 6, 1991

[51] Int. Cl.⁵ .............................................. G01B 5/00
[52] U.S. Cl. ................................ 33/519; 33/501.0; 33/549
[58] Field of Search ................ 33/519, 501.09, 548, 33/501.3, 501.4, 533, DIG. 14

[56] References Cited

U.S. PATENT DOCUMENTS 2,807,091  9/1957  Michelson ........................ 33/519
4,970,799  11/1990  Proell et al. ...................... 33/519

FOREIGN PATENT DOCUMENTS

0769303  10/1980  U.S.S.R.

Primary Examiner—Harry N. Haroian
Attorney, Agent, or Firm—Breiner & Breiner

[57] ABSTRACT

The invention is directed to an adaptor device suitable for use with a measuring apparatus to determine the centrality to the centerline of a Woodruff keyway in a shaft. The adaptor allows the measuring apparatus to rest on the top surface or outside diameter of the shaft so that the measuring apparatus can be used to measure the centrality of the side walls to the centerline of the keyway. Accordingly, the measuring apparatus can operate without reference to the bottom of the keyway due to the use of the adaptor of the present invention which is connected to the measuring apparatus. The adaptor can be structured so that it is usable with a measuring apparatus to measure keyways of varying sizes in shafts of varying sizes.

10 Claims, 3 Drawing Sheets

FIG. 12

DEVICE FOR MEASURING WOODRUFF KEYWAYS AND METHOD OF USING

RELATED APPLICATION

The present application is related in subject matter to U.S. Ser. No. 07/513,062, filed Apr. 23, 1990, now U.S. Pat. No. 4,970,799 which has the same inventors and assignee as the present invention. U.S. Pat. No. 4,970,799 is incorporated herein by reference.

FIELD OF THE INVENTION

The present invention is directed to a device useful in measuring the centerline of a Woodruff keyway formed in a shaft and a method of using the device. The device in conjunction with a suitable measuring apparatus allows a Woodruff keyway to be measured for accuracy of cut and, in the event the cut is in error, is capable of indicating the variation present and thereby the correction necessary to be made.

BACKGROUND OF THE INVENTION

Figures 1, 2, 3:
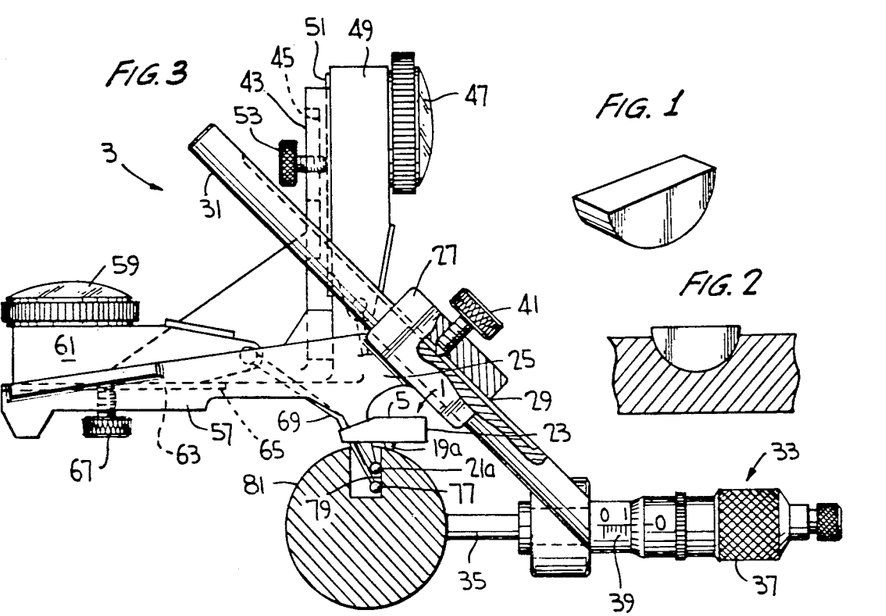
FIG. 1 is a perspective view of the shape of a Woodruff keyway as it would be formed in and present along the length of a shaft.
FIG. 2 is a fragmented cross-sectional side view of a Woodruff key present in a shaft.
FIG. 3 is a side view of a measuring apparatus including a micrometer, a horizontal indicator dial connected to a horizontally extending probe, a vertical indicator dial connected to a vertically extending probe, and the adaptor of the present invention containing a first pair of legs extending therefrom and a second pair of legs extending therefrom wherein the second pair of legs is longer than the first pair of legs, shown in relation to a shaft and a keyway formed therein as used in measuring the accuracy of the cut of the shaft keyway. The keyway shown is a Woodruff keyway. However, due to the lengthwise nature of the curve of the Woodruff keyway, the curve is not visible in the cross sectional view of the shaft shown in FIG. 3.

Various gauge means for checking the accuracy of a keyway cut in a shaft are known in the art. The devices as known in the art, however, are not capable of measuring the centrality of Woodruff keyway walls to the centerline of the keyway. A key is a means inserted into a given space to lock or hold parts of a mechanism or structure together, for example a small piece of metal fitting into a matching slot in a hub of a wheel or the like and the shaft on which the wheel is mounted so that torque is transmitted from one to the other. A Woodruff key is a key having the form of a nearly semicircular disk fitting into a recess in a shaft, as shown in FIG. 2. Accordingly, a Woodruff keyway is curved as shown in FIG. 1. A Woodruff keyway is formed in a shaft so that the curve extends along the length of the shaft and not widthwise or crosswise in the shaft. No measuring devices are currently known capable of measuring the centering of Woodruff keyways. In order to check for the centering of Woodruff keyway side walls, separate time consuming measurements are required unless an instrument having a key cut to size to fit within the keyway is utilized. Such an instrument results in added cost to the cutting and measuring operation since the device is suitable for use with only one size keyway.

For example, the use of a horizontal indicator dial and probe in conjunction with a micrometer is currently available on the market through the company A.u.W. Busch GmbH and Company. This device, however, does not contain any means for measuring the perpendicularity of a keyway side wall to the centerline of the keyway. It cannot in particular check a Woodruff keyway centerline.

U.S. Pat. No. 4,970,799, which has the same assignee as the present invention, discloses a device for measuring the perpendicularity of a shaft keyway's side walls to the centerline of the keyway cut in a shaft, as well as measuring the centering and parallelism of the keyway formed and a method of using the device. In using the device disclosed in the '799 patent to measure a keyway, however, the device is positioned in relation to the angle formed at the juncture of the base wall with the side wall When the keyway to be measured is in the form of a Woodruff keyway, this juncture is curved, thereby making it impossible to obtain a consistent stable measurement.

Figure 12:
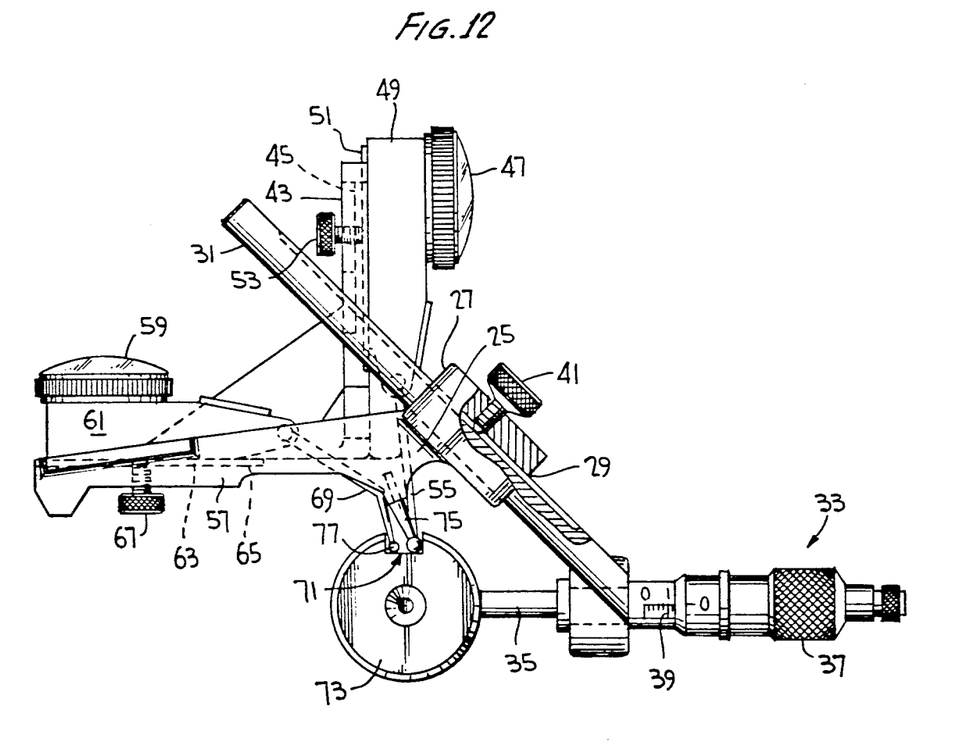
FIG. 12 is a side elevational view of a measuring apparatus for measuring a shaft keyway positioned in a standard shaft keyway as described in U.S. Pat. No. 4,970,799.

More particularly, the preferred embodiment of the device disclosed in the '799 patent, as shown in FIG. 12 herein, includes a micrometer 33 slidingly attached to the device, a vertical indicator dial 47 slidingly attached to the device and connected to a vertically extending probe 55 which is positionable in a shaft keyway 71, a horizontal indicator dial 59 slidingly attached to the device and connected to a horizontally extending probe 69 positionable in a shaft keyway 71, and two stationary legs extending downward from the device for seating in a shaft keyway, only one stationary leg 75 being shown in FIG. 12.

In operation, the horizontal indicator dial and horizontal probe are utilized to check the centering and parallelism of the keyway and the vertical indicator dial and vertical probe are utilized to check the perpendicularity of the keyway side walls to the centerline of the keyway.

In use, the two stationary legs are positioned in one of the base angles which are formed at the point which one side wall of the keyway meets the base wall of the keyway. The micrometer is then positioned so that it abuts the approximate centerline of the shaft. To check the centering of the keyway, the tip 77 of the horizontal probe 69 is positioned approximately one-half the distance across the keyway from the two stationary legs of the device. The micrometer is set at zero while making sure that the horizontal probe tip remains in contact with the keyway base. The horizontal indicator dial is then set to zero. Thereafter, the device is removed from the shaft keyway and turned 180° and repositioned in the keyway in the same manner but without adjustment to the dials or probe position. The reading on the horizontal indicator dial should still be zero. If it is not, the micrometer is moved in or out to provide the variation present which indicates the correction to be made.

To check the parallelism to the centering of the keyway, the same procedure is followed as in checking the centering of the keyway with the exception that rather than turning the gauge 180° at the same point in the keyway, the device is moved to the opposite end of the keyway. The reading on the horizontal indicator dial should remain at zero following the repositioning, and if not, the micrometer is turned until the horizontal indicator dial registers zero. The reading on the micrometer then indicates the variation and the correction to be made.

To check the perpendicularity of the keyway side walls to the centerline of the keyway, the vertical indicator dial and probe are utilized. The device is positioned in the keyway in the same manner with respect to the stationary legs and micrometer as for checking the centering and parallelism of the shaft. The vertical indicator probe is adjusted downward until the probe tip touches the keyway side wall a suitable distance below the top edge of the side wall, for example, approximately 0.1 inch down the side of the wall. The vertical indicator dial and micrometer are each set to zero. The device is then removed from the keyway and turned 180° and repositioned in the shaft keyway making sure the stationary legs are seated properly in the keyway base and that the vertical probe tip is touching the opposite side wall the same distance down the side wall of the keyway as when positioned against the first side wall. The reading on the vertical indicator dial should still be zero, and if not, the reading on the indicator dial will tell the variation, and accordingly, the correction to be made.

The measuring apparatus as disclosed in U.S. Pat. No. 4,970,799, however, is not suitable for consistently and accurately measuring Woodruff keyways due to the manner of placement of the stationary legs in relation to the base wall and side walls of the keyway. The measuring of a Woodruff keyway, due to its curved walls would result in inconsistencies in readings.

Accordingly, the art does not describe a device which is economical and capable of accurately and consistently measuring the centrality of a Woodruff keyway side walls to the centerline of a shaft keyway either alone or in combination with another means of measuring a keyway shaft.

OBJECTS OF THE INVENTION

A primary object of the present invention, therefor, is to provide a device useful in measuring the centrality of a Woodruff keyway's side walls to the centerline of the shaft.

A further primary object of the present invention is to provide a device useful for measuring the centrality of a Woodruff keyway's side walls to the centerline of the shaft used in conjunction with a measuring apparatus which is capable of indicating any variation which is present in the keyway and thereby indicate the correction necessary to be made to the keyway cut.

A further primary object of the present invention is to provide a device which is capable of converting an apparatus which measures the centering, parallelism, and/or perpendicularity of a standard keyway, including indicating any variation which is present and thereby the correction necessary to be made to the keyway, into an apparatus capable of measuring the centrality of a Woodruff keyway's side walls to the centerline of the Woodruff keyway.

A further primary object of the present invention is to provide a device useful in measuring the accuracy of cut of a Woodruff keyway in a shaft which is capable of being utilized with Woodruff keyways and shafts of varying dimensions.

A further primary object of the present invention is to provide a method of utilizing the device of the present invention for measuring the centrality of a Woodruff keyway's side walls to the centerline of a shaft keyway.

BRIEF DESCRIPTION OF THE INVENTION

The present invention is directed to a device useful in measuring the centrality of a Woodruff keyway side walls to the centerline of the keyway cut in a shaft. The device is an adaptor which is utilized in conjunction with an apparatus which is capable of indicating any variation which is present and thereby also indicating the correction necessary to be made to the keyway cut. The adaptor can be utilized with an apparatus which is normally capable of measuring the centering and parallelism of a standard keyway and/or the perpendicularity of the keyway, or can be used with an apparatus which is simply capable of measuring the centrality of a Woodruff keyway in a shaft.

The adaptor of the present invention, which is useful in measuring the centrality of a Woodruff keyway in a shaft, includes a C-shaped body having two pairs of stationary legs extending from the base wall of the body wherein each pair of legs is of a different length. The first or shorter pair of legs is utilized to position or hang the adaptor, and a measuring apparatus connected thereto, on or from the outside diameter or top wall surface of a shaft in the area adjacent a keyway formed in the shaft. The second or longer pair of legs is spaced from the first pair of legs so that when the first pair of legs holds the adaptor and apparatus affixed thereto from the outside diameter of the shaft, the longer set of legs extends into the keyway in the shaft along one side wall of the keyway. The length of each pair of legs will depend upon the size of the Woodruff keyway and shaft being measured. The larger the shaft and Woodruff keyway, the further apart the legs are necessary to be in order to stabilize the Woodruff keyway gaug in relation to the shaft and to accurately check the cut of the keyway.

The adaptor can be utilized with a measuring apparatus as disclosed in U.S. Pat. No. 4,970,799, as described above, which includes a horizontal arm containing a horizontal indicator dial, a vertical arm containing a removable vertical indicator and a slidable arm having a micrometer attached thereto. The adaptor of the present invention is connected to the body of that measuring apparatus at the point where the stationary legs of the apparatus are connected thereto. The stationary legs, therefore, of such apparatus would necessarily not be present or would be removed. The measuring apparatus is then capable of measuring the centrality of a Woodruff keyway. When the adaptor is removed, the stationary legs attached to the apparatus and vertical indicator mounted, the apparatus is then suitable for measuring the centering, parallelism, and perpendicularity of a standard keyway.

Alternatively, the adaptor of the present invention can be utilized with a measuring apparatus having solely a horizontal arm and indicator dial therewith. When the adaptor is connected to such a measuring apparatus, the apparatus is capable of measuring the centrality of a Woodruff keyway in a shaft. When the adaptor is removed and stationary legs inserted in its place, then the measuring apparatus is useful for measuring the centering and parallelism of a standard keyway.

When the adaptor is to be permanently attached to a measuring apparatus and used for the single function of measuring Woodruff keyways, a measuring apparatus having solely a horizontal indicator and probe, as opposed to both a horizontal and vertical indicator and probe, is sufficient since the vertical indicator and probe are not utilized in measuring the centrality of Woodruff keyways. This lowers the production costs of the apparatus making the apparatus more economical.

To check the centrality of a Woodruff keyway side wall to the centerline of the Woodruff keyway, the adaptor is connected to or present as a part of a measuring apparatus having a horizontal arm containing a slidable horizontal indicator dial with a horizontally extending probe attached thereto. The measuring apparatus additionally includes a micrometer slidingly attached to the apparatus. A clamp screw is present in relation to both the horizontal indicator dial and probe and the sliding micrometer so as to be able to maintain the horizontal indicator dial and probe and micrometer in selected positions.

To utilize the measuring apparatus having the adaptor of the present invention connected or present therewith, the clamp screw holding the horizontal indicator dial and probe in place is loosened so that the probe tip can be moved and positioned substantially in line with and below the longer pair of stationary legs extending from the base wall of the adaptor. The clamp screw is then tightened to hold the horizontal indicator and probe in place. Thereafter, the clamp screw which holds the sliding micrometer in place is loosened so that the position of the micrometer can be adjusted in relation to the shaft. The longer pair of stationary legs are then placed on the inside edge or side wall of the Woodruff keyway while the pair of shorter legs are rested on the outside diameter of the shaft, i.e. on the top wall surface of the shaft adjacent the keyway. The micrometer is slid up or down until it is positioned on the approximate centerline of the shaft. The clamp screw is then tightened to secure the micrometer in place.

The micrometer is then set to the closest zero while making sure that the horizontal indicator probe tip is in contact with the keyway side wall at a point preferably approximately 0.080 up from the bottom edges of the Woodruff keyway. If this is not the case, the indicator probe is adjusted by sliding the horizontal indicator one way or the other to obtain the correct location. The dial present on the horizontal indicator is then set to zero.

The measuring apparatus is then removed from the keyway and turned 180° and reinserted into the keyway in the same manner as described above, but in relation to the opposite side wall of the Woodruff keyway. The tips of the two pairs of stationary legs should be resting against the appropriate wall surfaces of the shaft in the same manner as previously described. The reading on the horizontal indicator is then checked. The reading should indicate zero. If not, the micrometer is turned in or out until an indicator reading of zero is obtained. Thereafter, the barrel of the micrometer is read in order to determine the variation to the centerline and the correction necessary to be made to the machine cutting the keyway. For example, if the variation indicated on the micrometer is 0.008 inches, then the keyway is off centerline by an amount of 0.004 inches.

DETAILED DESCRIPTION OF THE PRESENTLY PREFERRED EMBODIMENT

The present invention is directed to a device useful in measuring a Woodruff keyway formed in a shaft and a method of utilizing the device. The accuracy of the cut of a keyway in a shaft is very important to the use of the shaft and involves precise measurements. In the event that variation, i.e. inaccuracy, is present in the cut of the keyway, the shaft can be rendered useless for a particular purpose. Accordingly, it is necessary to be able to effectively and efficiently measure the dimensions of a shaft keyway to ensure that the cutting operation is proceeding correctly and to ensure that a properly cut shaft is present prior to use of the shaft. If the inspection procedures utilized in determining the proper dimensions of a keyway require a large expenditure of time, the cost of the manufacture of the shaft will rise undesirably. The device of the present invention provides for an efficient and exact means for determining the accuracy of the cut of a Woodruff keyway in a shaft. More particularly, the present invention can be used to determine the accuracy of the cut of a Woodruff keyway by checking the centrality of the side walls to the centerline of the keyway.

Figure 4:
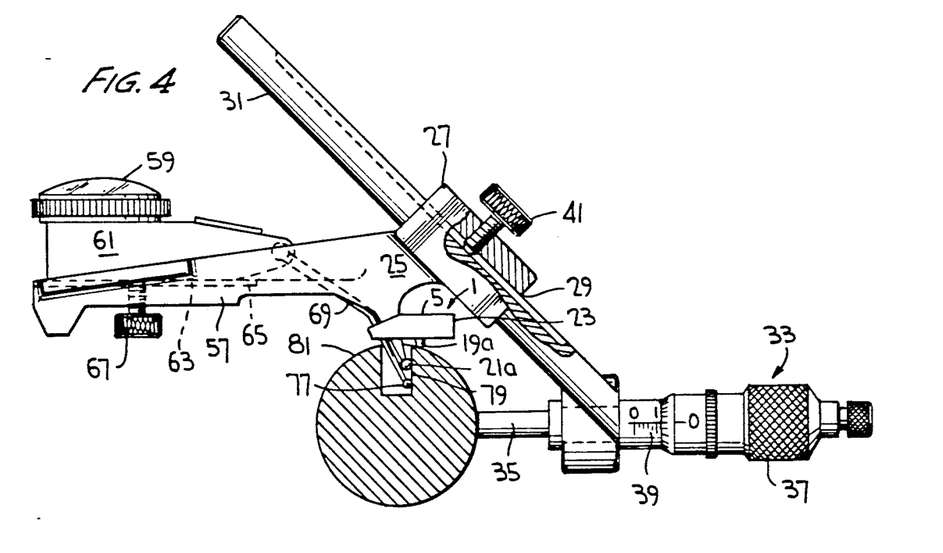
FIG. 4 is a measuring apparatus including a micrometer, a horizontal indicator dial connected to a horizontally extending probe, and an adaptor according to the present invention containing two pairs of legs extending therefrom shown in relation to a shaft and a Woodruff keyway formed therein as used in measuring the accuracy of the cut of the shaft keyway.

The device of the present invention can be utilized in measuring shafts of varying sizes and Woodruff keyways of varying sizes by modifying the locations of the stationary legs present in the device as will be described further below. Further, the device can be utilized with measuring apparatuses of varying capabilities in order to provide those apparatuses with the ability to accurately measure Woodruff keyways. FIGS. 3 and 4 illustrate one preferred embodiment of the device or adaptor of the present invention utilized with two different measuring apparatuses and the manner in which the device and attached apparatus are positioned in relation to a shaft and a Woodruff keyway formed therein to measure the centrality of the keyway.

The device, denoted generally as 1, is an adaptor suitable for connection to, or being formed as an integral part of, an apparatus containing quantitative measuring means, e.g. a micrometer and indicating means. The measuring apparatus 3 of FIG. 3 is capable of measuring the centering, parallelism and perpendicularity of a standard keyway when the adaptor of the present invention is removed and two stationary legs utilized as described in U.S. Pat. No. 4,970,799. The device illustrated in FIG. 4 is capable of measuring the centrality of a shaft with a Woodruff keyway when the adaptor of the present invention is utilized, or capable of measuring the centering and parallelism of a standard keyway with a level base wall when two stationary legs are utilized with the apparatus rather than the adaptor of the present invention. Accordingly, the adaptor of the present invention can be used to convert a measuring apparatus, which is normally only useful for measuring standard keyways, to be useful for measuring Woodruff keyways.

Figure 5:
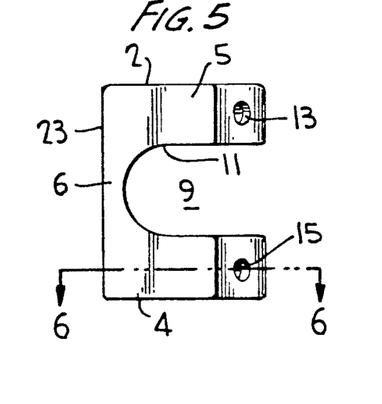
FIG. 5 is a top plan view of the C-shaped body of the adaptor of the present invention.
Figure 6:
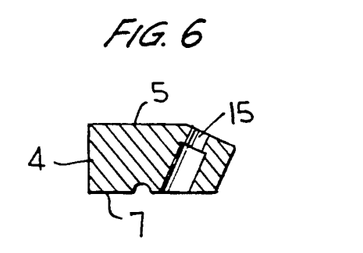
FIG. 6 is a cross section taken along line 6—6 of FIG. 5 showing the opening present in one arm of the C-shaped body in which a fastening means is inserted for fastening the adaptor of the present invention to a measuring apparatus.

The adaptor 1 of the present invention includes a C-shaped body, as best shown in FIG. 5, having a first arm 2, a second arm 4, and a bridging portion 6, which have a common top wall surface 5 and a common bottom or base wall surface 7. U-shaped side wall 11 forms opening 9 within the C-shaped body and allows for the extension of a probe therethrough as will be described further below. Top wall surface 5 preferably contains two openings 13 and 15 therein, one opening being present in the free end of each arm 2 and 4 of the C-shaped body. As shown in FIG. 6, opening 15 extends through arm 4 of the body. Opening 13 is formed in the same manner in relation to arm 2. When the adaptor is to be attached to a measuring apparatus, such as apparatus 3 shown in FIG. 3, a fastening means 17, such as a screw, is inserted through the base wall 7 into each of openings 15 and 13 so that the fastening means passes through top wall 5 and into a corresponding opening present in the measuring apparatus thereby serving to connect the adaptor to the measuring apparatus. Alternatively, openings 13 and 15 can be sized to receive an extension of the measuring apparatus therein and a fastening means can extend through the free end wall of each arms 2 and 4 so that the fastening means abuts the extension inserted into openings 13 and 15 so as to hold the adaptor to the extension.

Figure 7:
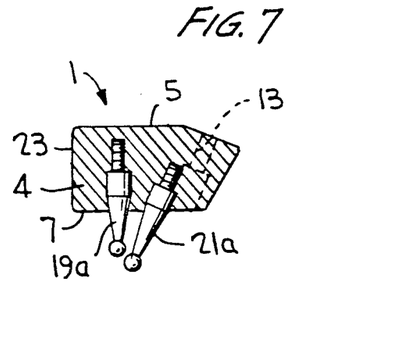
FIG. 7 is a cross sectional view of the adaptor of the present invention similar to FIG. 6 but containing two pairs of stationary legs extending from the base wall of the arms of the C-shaped body of the adaptor wherein only one leg of each pair of legs is visible. The second leg of each pair is present in the same position and length but positioned on the other arm of the C-shaped body.

Extending from base wall 7 of adaptor 1 are two pairs of stationary legs. The first pair of legs 19a and 19b extend for an identical length from base wall 7. The second pair of legs 21a and 21b extend an identical length from base wall 7. The second set of legs 21a and 21b are longer in length than the first set of legs 19a and 19b. The length of the two pairs of legs will vary depending upon the size of the shaft and keyway being measured. The adaptor, as shown in FIGS. 7 and 10, shows one embodiment wherein the legs extend from base wall 7 in a greater amount thereby allowing the adaptor to be utilized in the measuring of a smaller shaft and smaller keyway. The alternative embodiment illustrated in FIGS. 9 and 11, wherein the lengths of the extending legs are shorter as compared to their counterparts in FIGS. 7 and 10, is suitable for use in measuring larger shafts and keyways. The function of the difference in lengths of the two pairs of legs and the ability to vary the length of the legs to measure different size shaft keyways, concerns the degree to which the second pair of legs will extend into the keyway being measured. The larger the keyway, the shorter and farther apart the pair of legs which will be required in order to extend stably into the keyway so as to allow an accurate measurement to be obtained. This will be further evident when the positioning of the adaptor and measuring apparatus in relation to a shaft for measuring a keyway is described below.

Figure 8:
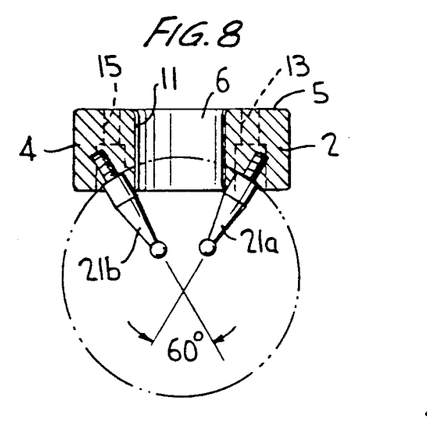
FIG. 8 is a front view of the C-shaped adaptor containing two pairs of legs as described in relation to FIG. 7 wherein only one pair of legs is shown.
Figure 9:
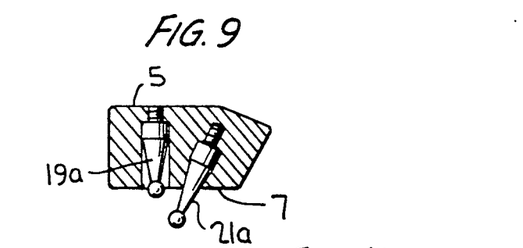
FIG. 9 is a cross sectional view of the adaptor of the present invention according to an alternative embodiment wherein the two pairs of legs extend at a different length from the base wall of the adaptor body as compared to the adaptor illustrated in FIG. 7. The embodiment of FIG. 9 is suitable for use with a shaft smaller in size while the embodiment illustrated in FIG. 7 is suitable for use with a shaft larger in size.
Figure 10:
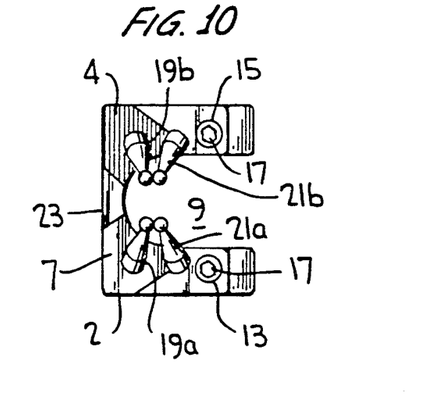
FIG. 10 is a bottom plan view of the adaptor of the present invention having two pairs of stationary legs projecting from the base wall thereof according to the embodiment illustrated in FIGS. 7 and 8.
Figure 11:
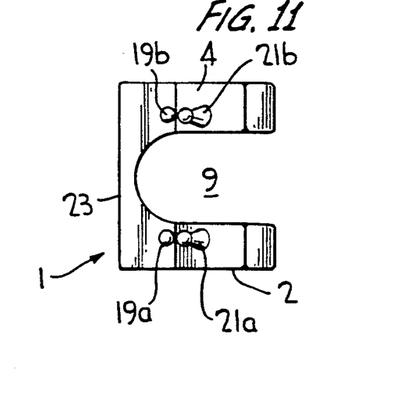
FIG. 11 is a bottom plan view of the adaptor having two pairs of legs extending from the base wall thereof according to the alternative embodiment shown in FIG. 9.

When the legs which extend from base wall 7 are short in nature as in the embodiment shown in FIGS. 9 and 11, the legs are positioned substantially parallel to the length of arms 2 and 4. The first pair of legs 19a and 19b can extend essentially straight outward from base wall 7. The second pair of legs 21a and 21b will extend outward at an angle so as to be angled toward rear wall 23 of the adaptor. Then when the measuring apparatus to which the adaptor is connected is rested against the side wall of a shaft keyway as will be described further below, the angle of the legs and the weight of the measuring apparatus will serve to stabilize the apparatus on the shaft, i.e. better weight distribution and thereby balancing within the shaft keyway is achieved. The measuring apparatus will be maintained in a level position when angled on a shaft as will be described further below in relation to the method of using the adaptor. When the legs extend for a greater length from base wall 7, it is preferred that each pair of legs angle inward towards the approximate centerline of opening 9 to thereby provide better stability and to allow for a better approximation of the positioning of a probe in relation to the legs as will be described further below in relation to the use of a measuring apparatus and the adaptor. A suitable angle and positioning of the legs which are longer in length are best illustrated in FIGS. 8 and 10. Each leg of a given pair of legs extends from base wall 7 in an identical manner. Accordingly, in the embodiment as illustrated in FIG. 9 wherein the first pair of legs 19a and 19b do not angle in any direction, the legs are parallel to each other. The second pair of legs will angle toward rear wall 23 in an equal degree, and if also angling inward, as shown in the embodiment of FIG. 8, will angle inward in an equal degree.

Preferably, each of the legs of the two pair of legs will have a smooth ball tip at the free end of the leg. This allows for easier movement and adjustment of the position of the legs in relation to the keyway and shaft during the measuring of the keyway.

As stated above, the adaptor of the present invention is useful with a measuring apparatus as described in U.S. Pat. No. 4,970,799 and illustrated in FIG. 12. The measuring apparatus includes a unitary body 25 which is preferably made of a solid material, such as a cast metal, aluminum alloy or the like. One portion of body 25 is a hand or finger grip portion 27 which has a passageway 29 formed therein which extends through the length and each end of finger grip portion 27. A bar 31 passes in sliding relation through passageway 29 in finger grip 27. A micrometer 33 is connected by a suitable means to the base of bar 31. The micrometer includes a forward extending member or projection 35 which is movable upon rotation of the handle 37 of micrometer 33. Micrometer 33 contains conventional gauge indicia 39 for indicating degrees of measurement. Upon rotation of handle 37 of micrometer 33, plus or minus readings in relation to the indicia are available. A screw nut 41 is threadedly engaged in finger grip 27 in perpendicular relationship to passageway 29 so that screw nut 41 can come in contact with bar 31 upon tightening of screw nut 41. Screw nut 41 is utilized to secure bar 31 in place in passageway 29. When screw nut 41 is loosened, bar 31 is slidingly movable within passageway 29 thereby allowing micrometer 33 to be moved into various positions. This allows the device to be adapted and thereby usable with shafts of varying sizes.

Body 25 of the device additionally has an upwardly extending arm 43 having groove 45 formed therein. An indicator dial 47 is attached to a body 49 which has a lengthwise projection 51 which fits within groove 45 to allow for the sliding engagement of indicator dial 47 and body 49 to arm 43. A screw nut 53 is threadedly engaged to arm 43 in perpendicular relationship to groove 45 in arm 43. When screw nut 53 is screwed inward into arm 43, screw nut 53 abuts projection 51 and serves to hold body 49 in a desired location. By unscrewing or loosening screw nut 53, body 49 of the dial indicator 47 can slide in groove 45 and thereby have its position adjusted.

Extending downward from the base of body 49 is a vertical probe 55. Vertical probe 55 is functionally attached to dial indicator 47 through body 49 in a conventional manner so that pressure upon vertical probe 55 will provide a corresponding reading upon dial 47. For example, dial indicator 47 provides measurement in increments of 0.0005 inches. Vertical probe 55 is touch sensitive so that upon pressure on the tip of vertical probe 55, the dial will move in corresponding relation to the amount by which vertical probe 55 has moved. The sensitivity of the probe and the dial indicator increments utilized can vary and will depend upon the precision desired. This is determined utilizing conventional criteria.

Body 25 additionally has a horizontally extending arm 57 to which a horizontal indicator dial 59 is attached in a manner similar to that of vertical indicator dial 47.

More specifically, horizontal indicator dial 59 is attached to body 61 which has a lengthwise projection 63. Projection 63 is complementary to and fits within groove 65 formed in horizontal arm 57. Accordingly, body 61 and dial indicator 59 are slidably attached to horizontal arm 57. A screw nut 67 is threadedly engaged in horizontal arm 57 in perpendicular relation to groove 65. Upon tightening screw nut 67, screw nut 67 is caused to abut body 61 and serves to hold body 61 in a desired position. Upon loosening of screw nut 67, body 61 is slidably within groove 65. Attached to body 61 of vertical indicator 59 is a horizontally extending probe 69. Probe 69 extends at a downward angle through body 25 at approximately the same point as vertically extending probe 55. Body 25 contains an opening therein which permits vertically extending probe 55 and horizontally extending probe 69 to pass through body 25 so that upon positioning of the measuring device on a shaft, probes 55 and 69 can extend into a keyway 71 formed in shaft 73. Horizontally extending probe 69 angles downward in an appropriate manner as illustrated in FIG. 12. Probe 69 is touch sensitive as with vertical probe 55 so that when pressure is placed on probe 69, a corresponding reading is transmitted to dial indicator 59. The measuring increments present on dial indicator 59 are such as to be useful for the nature of the measurement work being performed. In the device of the invention preferable increments are 0.0005 inches.

Additionally extending from body 25 of the device are first and second stationary legs, only one stationary leg 75 being shown in FIG. 12. The stationary legs are parallel to each other and of the same length. The legs, as indicated by leg 75, extend downward from body 25 a predetermined length. The length is dictated by the size o the keyway shaft to be measured. The legs must be capable of being seated in the angle where the side wall of the keyway meets the base wall while maintaining the measuring device over the shaft. The extent probe 69 extends downward is approximately the same a that of the stationary legs. Each of these members ultimately come into contact with the base wall of the shaft keyway.

The measuring device 3 as illustrated in FIG. 3 is the same as described above with the exception that the adaptor 1 has been attached to the measuring apparatus at the location at which the two stationary legs are attached. The stationary legs are therefor either removed, if the adaptor is being used to convert the measuring apparatus, or the apparatus can be made to initially include the adaptor. Openings 13 and 15 are made to correspond with openings present in body 25 which are normally for receiving the two stationary legs. Openings 15 and 13 are aligned to correspond to the points where the two stationary legs are or would be attached to the body 25 of the apparatus. If present, the stationary legs are removed by unscrewing or the like and adaptor I attached thereto by aligning openings 13 and 15 with corresponding openings in body 25 and then placing a fastening means 17 through openings 13 and 15 wherein the fastening means then enter the openings in body 25 of the measuring apparatus so as to join the two bodies together.

The embodiment illustrated in FIG. 4 is substantially the same as that in FIG. 3 with the exception that the vertical arm 43 and vertical indicator 47 and their attachments are not present therewith. This is a simplified version of the measuring device which is more economical if the measuring apparatus is to be primarily used only to measure the centrality of Woodruff keyways. This simplified version is more practical in terms of cost of production and size.

When the adaptor 1 is connected to either the measuring apparatus of FIG. 3 or FIG. 4, the rear wall 23 of the adaptor is facing slide bar 31 of micrometer 33. Horizontally extending probe 69 in use is adjusted in position so that probe 69 extends into opening 9 present in relation to adaptor 1. In particular, probe tip 77 of horizontal probe 69 will extend in relation to the two pairs of legs extending from base wall 7 during use of the adaptor with the measuring apparatus. The method of using the adaptor of the present invention is the same whether the pairs of legs extending from base wall 7 are longer or shorter in length. Additionally, whether in use with a measuring apparatus as illustrated in FIG. 3 or FIG. 4, the adaptor is utilized in the same manner. When the adaptor is utilized with a measuring apparatus as shown in FIG. 3 to measure a Woodruff keyway, the vertical arm 43 and its attachments are not utilized. To measure a Woodruff keyway with the measuring apparatuses of FIGS. 3 and 4, the adaptor is utilized in conjunction with the horizontal arm 57 and its attachments and micrometer 33.

More specifically, to utilize a measuring apparatus in conjunction with the adaptor of the present invention, clamp screw 67 is loosened and horizontally extending probe 69 moved so that the probe tip 77 appears to be in line with and below the second or longer pair of legs 21a and 21b. The position of the horizontally extending probe 69 is then secured by tightening clamp screw 67.

Thereafter, clamp screw 41, which holds the sliding micrometer bar 31 in place, is loosened. The second pair of legs 21a and 21b are then placed on the inside edge or side wall 79 of a Woodruff keyway formed in a shaft, while resting the first or shorter pair of legs 19a and 19b on the outside diameter 81 of the shaft. The micrometer bar 31 is then slid up or down until bar 35 is on the approximate centerline of the shaft 73. Bar 31 is then secured in place by tightening clamp screw 41.

The micrometer is then set to the closest zero, not to exceed one revolution of the micrometer. Tip 77 of the horizontally extending probe 69 should at this point be in contact with the keyway side wall approximately 0.080 from the bottom edge of the Woodruff keyway. If the probe tip is not in such a position, the position of the probe tip can be adjusted by loosening screw clamp 67 and adjusting the indicator probe 69 by sliding the probe one way or the other to obtain the correct location. Clamp screw 67 would then be tightened to secure probe 69 in place. Indicator dial 59 is then set to zero.

The measuring apparatus is then removed from the shaft keyway by means of finger grip portion 27. The measuring apparatus is turned 180° in relation to the Woodruff keyway and reinserted into the keyway. The two pairs of legs extending from base wall 7 of adaptor 1 are caused to rest against the opposite side wall of the keyway and outside diameter of the shaft the same as described above. The reading on the horizontal indicator 59 is then taken. The reading should be zero. If not, the micrometer should be turned by handle 37 in or out until an indicator reading of zero is achieved. The measurement indicator 39 of the micrometer is then read. This measurement will indicate the variation to the centerline which is present in the keyways and the correction necessary to be made to the keyway to provide centrality to the keyway. For example, if the difference indicated on the micrometer is 0.008 inches, the keyway is off the centerline by 0.004 inches. Appropriate corrective action ca then be taken.

As will be apparent to one skilled in the art, various modifications can be made within the scope of the aforesaid description. Such modifications being within the ability of one skilled in the art form a part of the present invention and are embraced by the appended claims.

It is claimed:

1. An adaptor for use with a shaft keyway measuring apparatus comprising a C-shaped body having a first arm, a second arm, and a bridging portion wherein said first arm, said second arm, and said bridging portion have a common top wall surface and a common base wall surface; a first pair of identical legs extending from said base wall surface of said C-shaped body; and a second pair of identical legs extending from said base wall surface; wherein one leg of each of said first and said second pair of legs are positioned on said first arm and said second arm, each leg of said first pair of legs is positioned adjacent said bridging portion of said C-shaped body, and said second pair of legs are longer in length than said first pair of legs.

2. The adaptor of claim 1 wherein each leg of said second pair of legs angles toward the leg of said first pair of legs which extends from the same arm of said C-shaped body as the leg of said second pair of legs angling theretoward.

3. The adaptor of claim 1 wherein said first pair of legs are positioned substantially parallel to said second pair of legs.

4. The adaptor of claim 1 wherein each of said legs of said first and said second pair of legs angle inward toward the centerline of open space which is present between said first arm and said second arm of said C-shaped body.

5. The adaptor of claim 1 wherein each of said legs of said first and said second pair of legs has a smooth 6. An apparatus for measuring the centrality of the side walls of a shaft keyway comprising:
   (a) a body having a finger grip portion, a horizontally extending arm and an adaptor extending from said body; said adapter comprising a C-shaped body having a first arm, a second arm, and a bridging portion wherein said first arm, said second arm, and said bridging portion have a common top wall surface and a common base wall surface; a first pair of identical legs extending from said base wall surface of said C-shaped body; and a second pair of identical legs extending from said base wall surface; wherein one leg of each of said first and said second pair of legs are positioned on said first arm and said second arm, each leg of said first pair of legs is positioned adjacent said bridging portion of said C-shaped body, and said second pair of legs are longer in length than said first pair of legs;
   (b) a bar slidingly attached to said finger grip portion of said body having a micrometer affixed to one end of said bar, said micrometer having a forwardly extending movable member;
   (c) a pressure sensitive horizontally extending probe operatively connected to an indicator device which is slidingly attached to said horizontally extending arm of said body.

7. An apparatus according to claim 6 wherein said body further comprises a vertically extending arm and a pressure sensitive vertically extending probe operatively connected to an indicator device which is slidingly attached to said vertically extending arm.

8. An apparatus according to claim 6 wherein said body is of one unitary piece.

9. An apparatus according to claim 8 wherein said unitary body is made of a cast metal.

10. A method of measuring the centrality of the side walls of a Woodruff keyway to the centerline of said keyway in a shaft utilizing the apparatus according to claim 5 or claim 6 comprising:
   (a) positioning said first pair of legs on said shaft's outside diameter adjacent said keyway in said shaft and positioning said second pair of legs on a first side wall of said keyway;
   (b) sliding said horizontal indicator device so that said horizontally extending probe connected thereto abuts said first side wall of said keyway in line with said second pair of legs of said adaptor a predetermined distance down from the top edge of said first side wall and maintaining said indicator device at that point;
   (c) abutting said forwardly extending moveable member of said micrometer against the approximate centerline of said shaft containing said keyway;
   (d) setting said indicator device connected to said horizontally extending probe and said micrometer each to a datum point;
   (e) removing said apparatus from said keyway;

(f) turning said apparatus 180° and repositioning said apparatus in said keyway without moving said forwardly extending member of said micrometer or said horizontal probe so that said forwardly extending member abuts the approximate centerline of the opposite side of said shaft and said first pair of legs abuts said outside diameter of said shaft and said second pair of legs abuts a second side wall of said keyway; and (g) comparing the reading on said horizontal indicator device in step (d) with the reading on said indicator device after said apparatus is repositioned in said keyway according to step (f), if said reading is not equal, adjusting said micrometer until said reading is equal.

* * * * *